United States Patent [19]
Terry

[11] 3,831,708
[45] Aug. 27, 1974

[54] AIR FILM PALLET
[76] Inventor: Melvin D. Terry, 707 N. 188th, Seattle, Wash. 98133
[22] Filed: Nov. 1, 1972
[21] Appl. No.: 302,827

[52] U.S. Cl. ............................ 180/119, 180/125
[51] Int. Cl. ........................................ B60v 1/00
[58] Field of Search .......................... 214/1 BE; 180/116–130

[56] References Cited
UNITED STATES PATENTS

| | | | |
|---|---|---|---|
| 2,564,002 | 8/1951 | Gibson | 180/52 |
| 3,052,483 | 9/1962 | Petersen | 180/123 |
| 3,173,510 | 3/1965 | Smith | 180/119 |
| 3,185,238 | 5/1965 | Coates | 180/125 |
| 3,202,232 | 8/1965 | Rogers | 180/119 |
| 3,372,769 | 3/1968 | Jung et al. | 180/119 |
| 3,390,736 | 7/1968 | Thomas | 180/119 |
| 3,407,896 | 10/1968 | Billin et al. | 180/119 |
| 3,648,796 | 3/1972 | Gamundi | 180/119 |
| 3,693,729 | 9/1972 | Blurton et al. | 173/23 |

Primary Examiner—Robert J. Spar
Assistant Examiner—Ross Weaver
Attorney, Agent, or Firm—Cole & Jensen

[57] ABSTRACT

A powered, air film vehicle adapted for lifting exceptionally heavy loads and moving them with relatively little friction. The pallet includes a positive engagement drive wheel which controls the motion and direction of the vehicle as well as a guiding system at the opposite end of the pallet for controlling drift during movement. When in operation the entire weight of the objects to be moved is carried by a plurality of air bearings and other ground contacting means serve only as motion producing or guide means. A train of connected pallets may be moved by a single powered unit, however, it may be desirable to provide selectively activated guide wheels upon some or all of the pallets and a fixed direction auxiliary drive wheel may be utilized for lateral movement of the entire train.

1 Claim, 8 Drawing Figures

AIR FILM PALLET

BACKGROUND OF THE INVENTION

This invention relates to vehicles, and in particular to self-propelled load carrying vehicles which utilize a film of air as the medium which provides for frictionless movement over the surface supporting the weight.

The use of an air film to support objects is well known in the art and in particular, the air bearing such as disclosed in U.S. Pat. Ser. No. 3,618,694 granted to Walter A. Crowley Nov. 9, 1971 is readily adaptable for use in this type of operation.

Other applications of a curtain or film of air for supporting loads are disclosed in the following U.S. Pat. Ser. No. 3,124,209 granted to Flipse on Mar. 10, 1962; Ser. No. 3,202,232, granted to Rogers on Aug. 24, 1965; Ser. No. 3,268,023 granted to DiNapoli, Jr. on Aug. 23, 1966; U.S. Pat. Ser. No. 3,326,311 granted to Jung, June 20, 1967; Ser. No. 3,500,948 granted to Williamson, et al. on Mar. 17, 1970 and Ser. No. 3,593,817 granted to Hawkins July 20, 1971.

Each of the above noted apparati disclose broadly the concept of supporting a vehicle or load by means of an air cushion or an air film generated by an air bearing. Whereas these apparati disclose the broad concept, they suffer from several drawbacks. The prior art devices do not have the ability to lift extremely heavy loads because of the inherent weakness of the material used in the fabrication of the apparatus as well as the basic design. Alternatively, the prior art devices lack means for providing adequate and positive operator control. Control is necessary to prevent unwarranted movement when the load is supported by an air film and thereby essentially friction free. When the load is under an essentially frictionless condition, any outside influence will cause lateral movement.

Still another problem which is evident in the prior art devices lies in the fact that before the device itself can be moved, without the assistance of an external material handling vehicle, air must be provided. This condition prevents movement by a humanoid when for one reason or another there is no air supply or other lift vehicle.

With the above noted prior art and the deficiencies thereof in mind, it is an object of the present invention to provide an air film supported load carrying vehicle, including a means to provide a steerable positive traction drive for moving the loaded vehicle regardless of slope irregularities in the supporting surface.

It is another object of the present invention to provide an air film support vehicle wherein the vehicle includes guide wheels which allow the operator to maintain positive contact with the supporting surface thus assuring efficient tracking of the vehicle.

It is still another object of the present invention to provide a load supporting vehicle which is supported by air bearings and further includes means whereby the vehicle may be easily moved even if air is not available.

Still another object of the present invention is to provide an air film supported vehicle wherein the vehicle includes downwardly projected wheels which will support the weight of the vehicle but which will be automatically retracted without damage in the event that an excessive load is placed upon the vehicle.

Still a further object of the present invention is to provide a vehicle which because of its simplicity and versatility,, is capable of transporting loads of excessive length by interconnecting two or more air film supporting pallets with a single powered control vehicle.

Yet a further object of the present invention is to provide a vehicle capable of transporting loads of great length and to provide controlled movement of said vehicle in a direction normal to the common direction of travel.

Still a further object is to provide a vehicle which is basically of the air film type including guide wheels and a drive wheel to permit it to perform as a conventional and fully controllable vehicle for maneuvering into position and driving, under power, to a position beneath the load and to eliminate the necessity of any other type of equipment required in placing a load upon the pallet. To provide a vehicle wherein, when the air bearings inflate, they lift the load and the guide wheels and drive wheel extend and re-contact the floor for their design purposes.

DETAILED DESCRIPTION OF THE DRAWINGS

Figure 1:
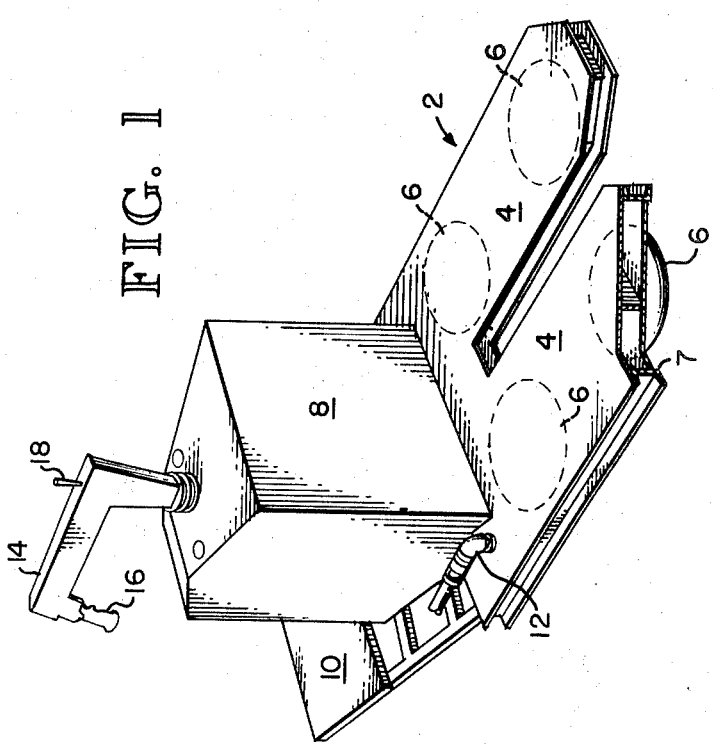
FIG. 1 is an isometric, environmental view partially broken away, of the subject invention.

As seen in FIG. 1 the inventive air film pallet comprises a load supporting platform which as shown in the preferred embodiment comprises a pair of forwardly extending legs 4, each being supported by a pair of air bearings 6. Although shown as a two armed element, it is to be understood that the pallet could be of one piece or even three piece depending on the configuration desired to best accommodate the most probable load.

As seen in the broken away portion of this Figure, the load supporting platform is a rigid structural member having channel members 7 extending about the periphery and interconnecting members, as noted later, joining the channel members 7 and surrounding the support wheels. The load supporting area is fabricated as a rigid unit to provide the strength necessary to support heavier than normal loads. As will be explained in greater detail herein after, any load supported by the platform will either be directly transferred to the vehicle supporting means through the framework or through the air bearings. The vehicle thus utilizes the inherent strength of the framework and does not subject the frame to flexing stresses.

Mounted to the rear of the pallet is a housing 8 containing the drive and steering mechanism that is described hereinafter as well as a platform 10 upon which the operator of the pallet may ride while operating the mechanism. Extending outwardly from one portion of the load supporting means is a quick disconnect connection 12 for use in supplying the air necessary for operation to the pallet from an external source. Secured to the upper portion of the housing 8 is a steering and control handle 14 having a forward/reverse control conveniently mounted upon the hand grip 16 and an upwardly extending stabilizing handle 18 giving the operator two places to grip to maintain his balance during movement of the pallet.

Figure 2:
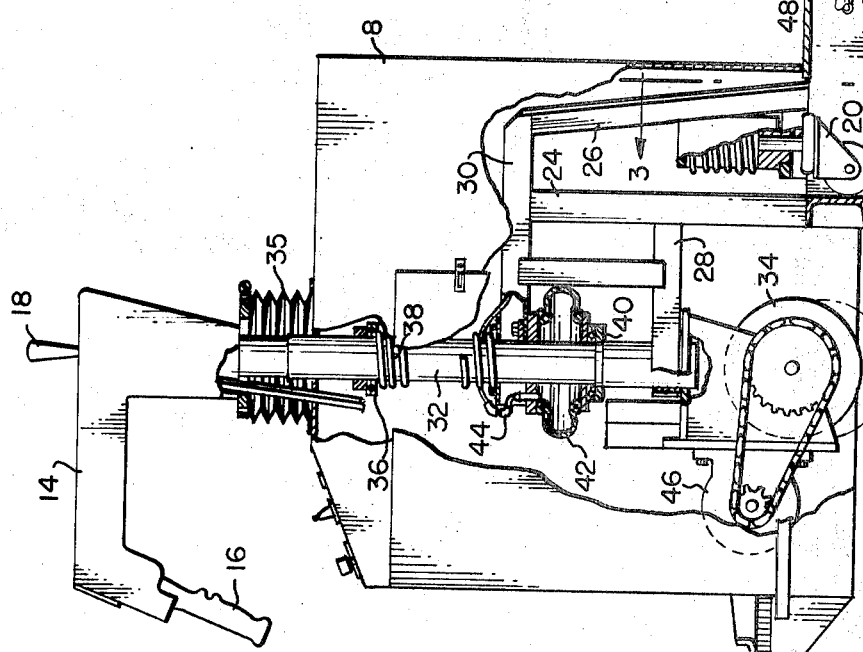
FIG. 2 is an elevational view, partially broken away, of the pallet, as shown in FIG. 1.
Figure 3:
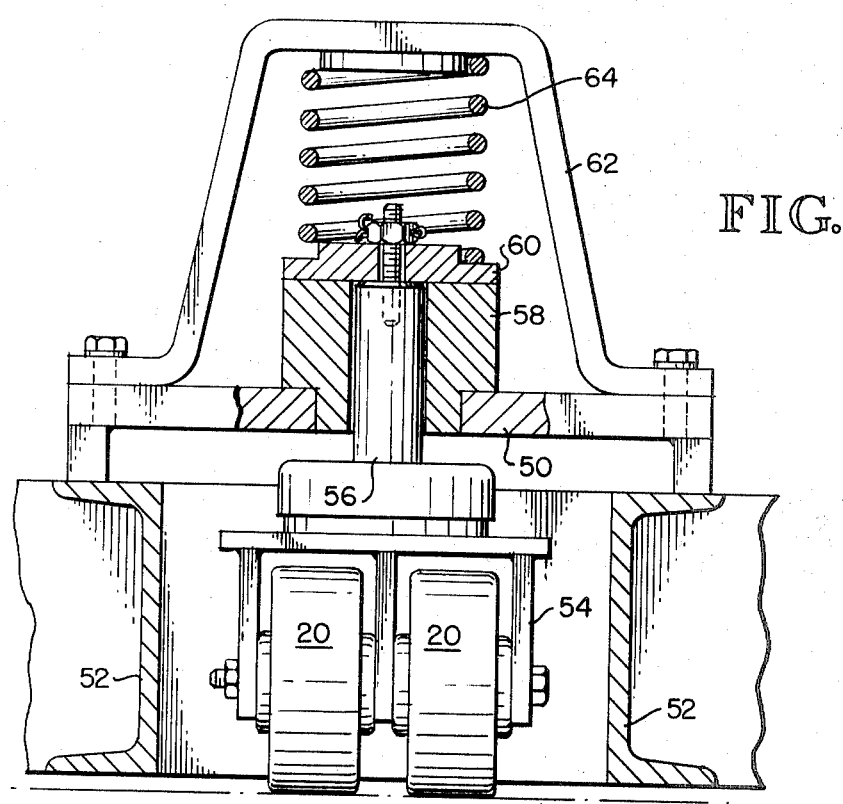
FIG. 3 is an enlarged view of the pallet supporting overloading retracting caster.

As seen in FIG. 2, a rear caster 20, to be described in detail with respect to FIG. 3, is mounted to support the vehicle when it is not loaded. The caster 20 is spring biased to its outmost position with extends slightly below the lower-most edge of the framework 7 and is indicated by the solid line indicating a supporting surface. The broken line which also indicates the supporting surface, depicts the relative position the elements would assume when the pallet is supported by an air film. When the pallet is supported by an air film, air bearings 6 are inflated and the guide wheels 22 as well as the drive wheel 34, both described in detail hereinafter, are urged outwardly to contact the supporting surface. Guide wheels 22 are similarly spring biased in a downward direction, whereby the lowermost surface of the guide wheel under normal conditions would extend slightly below the framework 5. The fact that the caster 20 and the guide wheels 22 extend below the framework when in their normal condition permits an operator to move the pallet when there is no source of external power by simply pushing the pallet and causing it to glide effortlessly upon caster 20 and guide wheels 22. Caster 20 and guide wheels 22 further allow an operator to drive the pallet when in open and unloaded condition.

Referring now particularly to the rear portion of the pallet, i.e., that seen to the left in FIG. 2, located within the housing 8 is an upwardly extending framework 24, 26 having rigidly secured thereto horizontally extending parallel stabilizing elements 28, 30. Horizontal elements 28, 30 have located at their outer end, a vertical bore to receive a vertical steering shaft 32. Vertical shaft 32 is integrally locked with steering arm 14 and extends downwardly from the upper portion of housing 8 to terminate beneath frame member 7 in a wheel 34. The shaft 32 is, as described in greater detail hereinafter, mounted to permit both vertical and rotational movement relative to the elements 28, 30.

Captured between the frame member 30, i.e., the upper of the two horizontal frame members, and a thrust bearing 99 against collar 36 fixedly mounted to the shaft 32 is a spring member 38 continuously urging the shaft and attached wheel to its uppermost position whereat it is above the plane formed by the bottom of the frame members 7 of the pallet. By thus continuously urging the wheel upwardly, the pallet, when not in use and in the unloaded contition, has only the caster 20 and the wheels 22 in contact with the floor. The limited floor contact makes it far easier to move the pallet without the availability of pressurized air.

Captured beneath the horizontal frame member 30 and above a fixed collar 40 on shaft 32 is an inflatable air bag 42 which has the necessary pneumatic connection 44 and can, under control of the operator, be expanded forcing the shaft 32 downward. Downward movement of shaft 32 compresses the spring 38 and forces the wheel 34 into contact with the supporting surface. By varying the pressure supplied to the air bag 42 the operator can provide the wheel 34 with sufficient pressure to assure traction and thus move the pallet, whether loaded or unloaded. The supply for the air bag 42 is provided with plumbing such that the air will maintain a constant pressure even through shaft 32 will move up or down vertically in response to a change in the supporting surface. This self compensating feature assures positive contact when negotiating a concave or convex approach to an incline ramp without subjecting the mechanism to excessive overloads. An accordian pleated sleeve 35 is secured to housing 8 and shaft 32 allowing the relative vertical and rotational movement of shaft 32. The wheel 34 receives a driving force from an air motor 46, which is preferably linked by a chain drive and reduction gearing to the wheel 34 thus providing either forward or reverse motion depending upon the rotation of the motor. Further to be seen in FIG. 2 are the horizontal support members 48 adding the necessary rigidity. The necessary pneumatic connections for assuring air supply to the air bearing, the air motor, the control mechanism, and the air bag 42 and shown schematically in this Figure.

Attention is now directed to FIG. 3, wherein the rear caster can be seen in greater detail. As seen in this Figure, the casters 20 are pivotally mounted beneath a plate 50 which bridges the distance between a pair of support members 52 and is rigidly secured thereto. The casters 20 are mounted upon an axle secured between the trunions 54 which are in turn mounted to a vertical shaft 56. Shaft 56 passes through a bearing 58, which is secured to the plate 50, and terminates against a cap 60. Similarly secured to plate 50 is a bridging strap member 62 which overlies the plate 60. Mounted between the lower portion of the bridging member 62 and the cap 60 is a compression spring 64, such that when an excessive weight is applied to the upper surface of the pallet the spring 64 will be compressed prior to sufficient stress being placed upon the caster to cause the destruction thereof.

Figure 4:
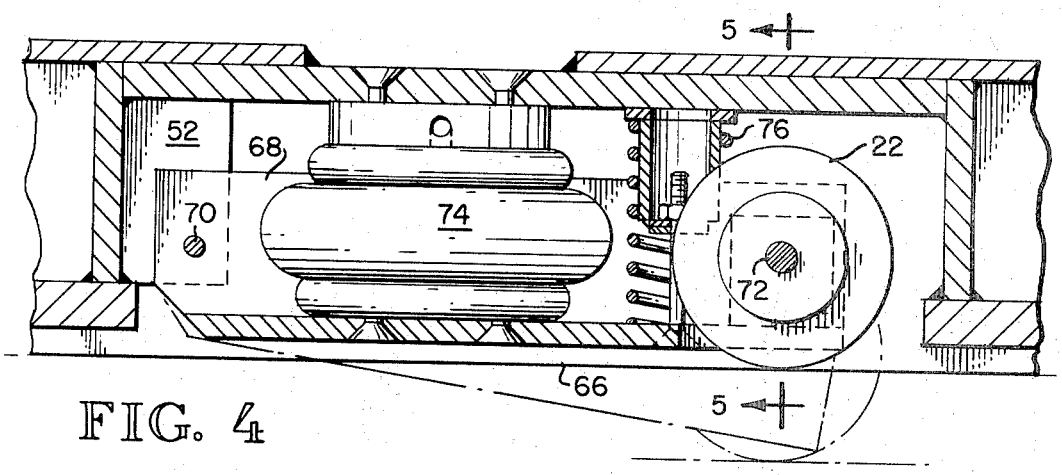
FIG. 4 is an enlarged side view of the power extensible guide caster.
Figure 5:
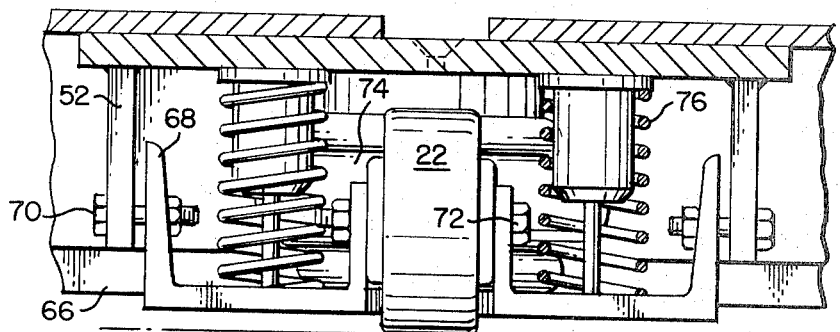
FIG. 5 is a view of the guide wheel taken along lines 5—5 of FIG. 4.

FIGS. 4 and 5 show the front guide wheels 22 which are secured to the lower portion of the frame of the pallet 2 and adapted for relative vertical movement. Guide wheels 22 are mounted to the framework via a pivotally mounted channel means 66. The channel 66 secured to the framework 52 by means of a hinge pin 70 and extends forwardly to terminate in an axle 72 upon which the wheel 22 is mounted. Intermediate the pivot 70 and the axle 72 is an inflatable air bag 74 which, under control of the operator, can be expanded to cause the wheel 22 to extend beneath the normal position beneath the frame and contact the supporting surface, providing proper guidance when the vehicle is operating on an air film. Likewise, mounted between the pivot point 70 and the axle 72 is a limited throw spring 76 which provides a continuous downward movement to the plate 66 thus assuring that the wheel 22, when in an unstressed condition, will extend slightly beneath the plane of the bottom of the framework. It is to be understood that when the air bag 74 is deflated, the wheel 22 will extend beneath the framework until an excessive load is placed upon the pallet, at which time the wheel will be forced upwardly, compressing spring 76 and allowing the framework to settle on the floor or other supporting surface.

Figure 6:
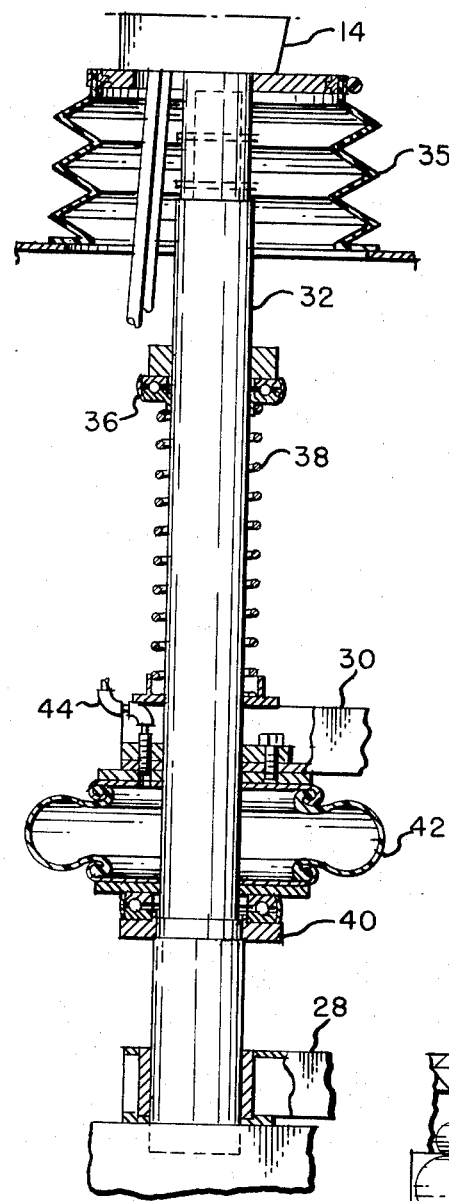
FIG. 6 is an enlarged view of the drive and steering wheel activator mechanism as seen in FIG. 2.
Figure 8:
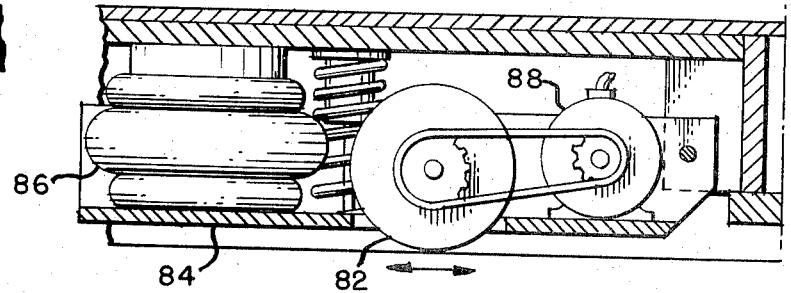
FIG. 8 is an enlarged view of the preferred means of providing controlled lateral movement when several pallets are interconnected as shown in FIG. 7.

Referring now to FIG. 6, the details of the construction of the steering and drive mechanism can more easily be seen. Spring 38 is captured between thrust bearing 99 bearing against collar 36 and frame member 30 continuously urging shaft 32 upwardly. Air bag 42 is secured between collar 40 and frame member 30 selectively urging shaft 32 downwardly. The interaction between spring 38 and air bag 42 gives the versatility necessary to the present invention.

Figure 7:
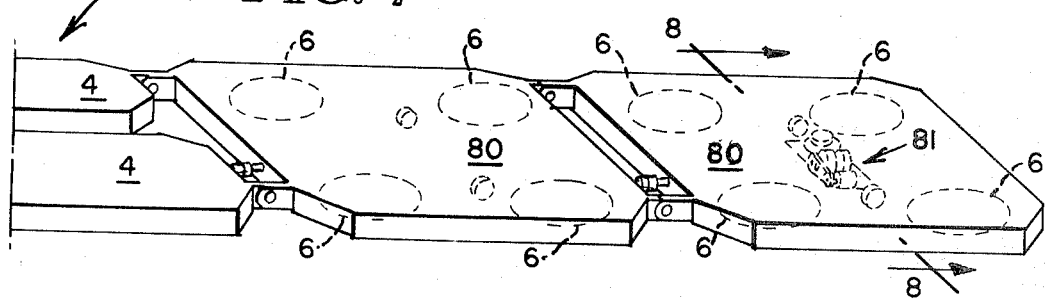
FIG. 7 is an isometric view of several air film supported pallets interconnected to function as a unit.

FIG. 7 depicts one possibility of interconnecting several pallets with the powered pallet 2 providing the necessary motion to secured pallets 80. Each pallet 80 would be supported by air bearings and be interconnected by hinge means 82 allowing relative vertical but not relative horizontal movement. Proper pneumatic interconnections, not shown, transmit air under pressure to each of the pallets to provide an air film. Each of the pallets will be provided with guide wheels 22 such as described relative to FIGS. 4 and 5 so that control may be selectively maintained.

When a train of pallets as seen in FIG. 7 is utilized, it may be desirable to move the entire train laterally as a unit. Auxiliary drive means 81 may be provided. This drive means could well comprise powered wheel 82 mounted to a hinged plate 84 which is selectively pivoted downwardly by air bag 86. Motion is provided by air motor 88.

Thus it can readily be seen that the present air film supported pallet offers many advantages over the conventional forklift in the fact that it is capable of lifting far greater loads, it is more easily moved across the supporting surface with the load in position, and further, is of a simple, carefree, literally damage proof structure.

The embodiments of the invention in which an exclusive property or privilege is claimed are defined as follows:

1. A vehicle comprising,
   a frame having a rear control section and a forward bi-furcated platform section, said platform section having a top load-receiving platform surface and a bottom ground support surface interrupted by cavities, front guide wheel means and a rear caster wheel means housed in respective said cavities and each spring-biased to move downwardly to a wheel support plane slightly below said ground support surface and to there collectively support the vehicle when the platform is not loaded,
   air bearings housed in respective said cavities and arranged when inflated to expand below said wheel support plane and support the vehicle on respective air films defining an air film support plane below said wheel support plane,
   first air spring means in said cavities for further urging said front guide wheels downwardly into ground engagement when the vehicle is supported by said air bearings,
   a vertically movable rear steerable traction wheel means housed in said control section and located rearwardly of said caster wheel means,
   spring means urging said traction wheel means into an inactive position above said ground support surface,
   second air spring means opposing the latter spring means for selectively moving said traction wheel into ground engagement when the vehicle is supported by the air bearings when loaded or by the guide wheel and caster wheel means when not loaded,
   an operator station on said control section and behind said traction wheel means,
   and control means operable at the operator station for selectively inflating said air bearings and first and second air spring means and for operating the traction wheel means, the spring-biasing of said guide wheel means and caster wheel means being such as to yield in an emergency with the platform loaded to thereby permit the vehicle to settle down to its said bottom ground support surface.

* * * * *